March 13, 1951  D. A. CHASE  2,544,655
SWIVEL
Filed Aug. 3, 1945  2 Sheets-Sheet 1
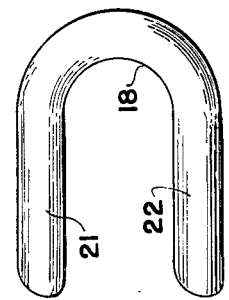
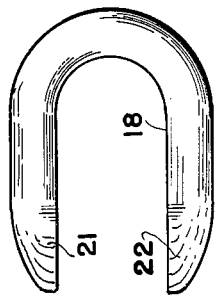
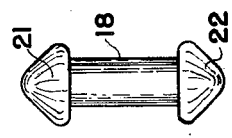
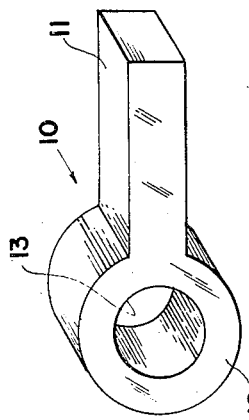
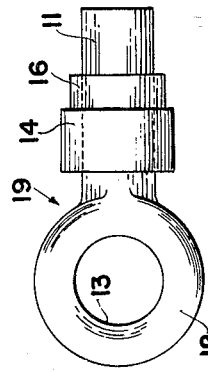
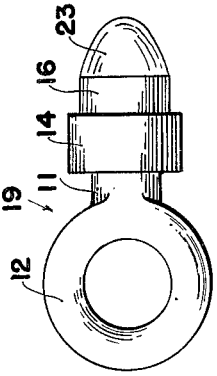
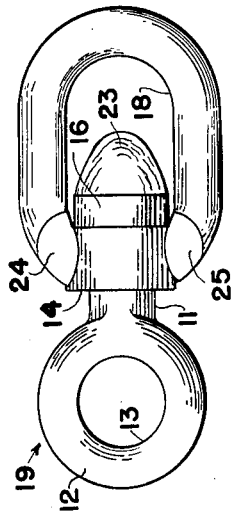
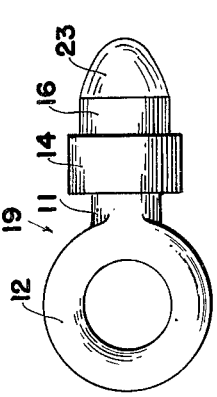
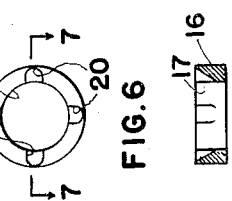
Inventor
DWIGHT A. CHASE
By Ralph L. Chappell
Attorney March 13, 1951     D. A. CHASE     2,544,655
SWIVEL
Filed Aug. 3, 1945     2 Sheets—Sheet 2
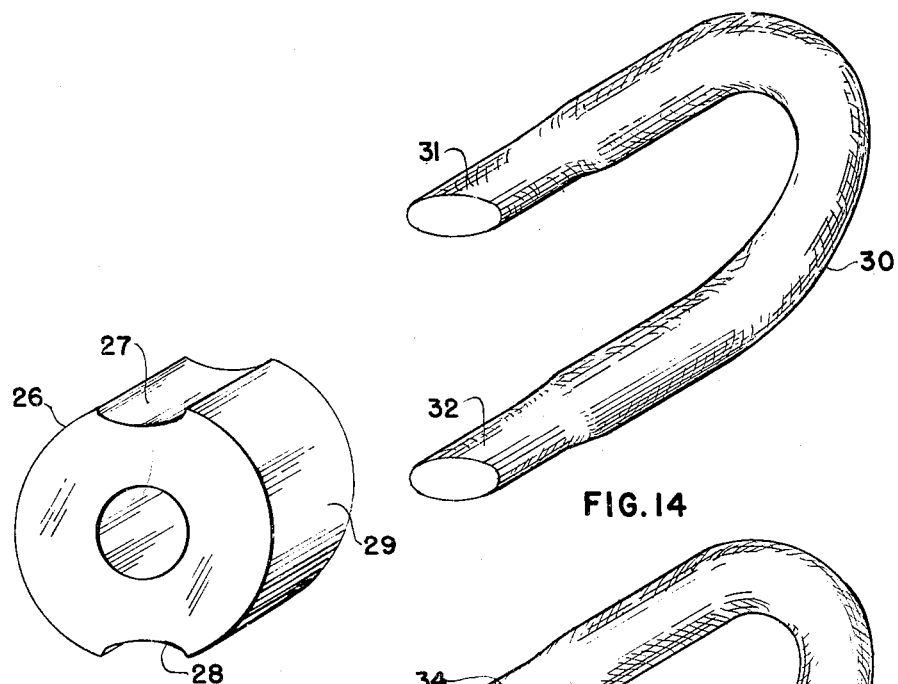
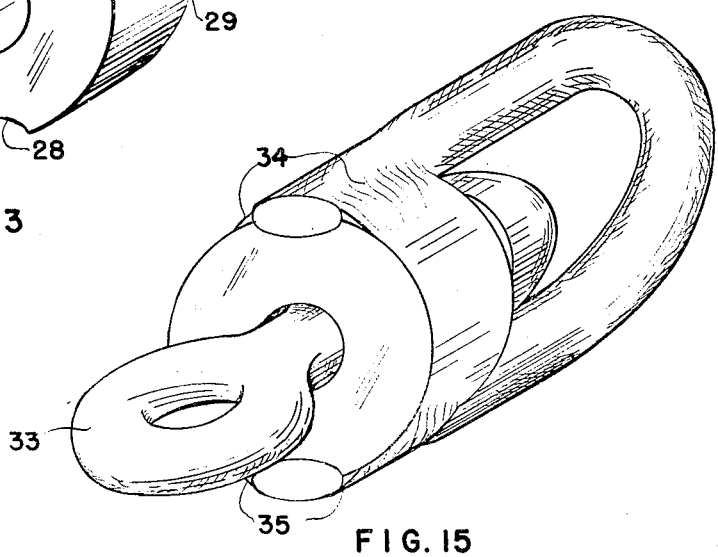
Inventor
DWIGHT A. CHASE
By Ralph L. Chappell
Attorney Patented Mar. 13, 1951

2,544,655

UNITED STATES PATENT OFFICE 2,544,655

SWIVEL

Dwight A. Chase, United States Coast Guard

Application August 3, 1945, Serial No. 608,817

1 Claim. (Cl. 59—35)

(Granted under the act of March 3, 1883, as amended April 30, 1928; 370 O. G. 757)

This invention relates to a method of producing a swivel and more particularly to the method of manufacturing a large swivel adapted for use in connecting buoys and the like to their anchor chains.

Swivels of the kind here considered have heretofore been made by forging the parts from wrought iron, a process requiring heavy machinery, forging dies, a skilled operator and a considerable amount of time. As a result these forged swivels are relatively expensive and the machinery and dies required limit available facilities so that emergency production of large quantities of swivels is not readily effected. Moreover, these factors tend to restrict production of large swivels to a very few manufacturers in one section of the country.

It is accordingly the object of this invention to provide a method of economically producing swivels of superior performance characteristics.

It is a further object of this invention to provide a method of constructing large swivels by fabrication from stock materials.

It is a further object of this invention to provide a method of fabricating a swivel loop link by welding together elements of simple form.

Other objects of the invention will be more fully disclosed in the following specification and claims.

In the drawing, Fig. 1 is an oblique view of the eye of the swivel as cut from metal plate.

Fig. 2 is an oblique view of the neck of the loop link.

Fig. 3 is an oblique view of the collar.

Fig. 4 is an oblique view of the loop of the swivel.

Fig. 5 is an elevation of the eye of the swivel after a forming operation and showing the collar and neck mounted thereon.

Fig. 6 is a plan view of the collar showing the notches in the inner face thereof.

Fig. 7 is a cross-sectional view of the collar along the line 7—7 of Fig. 6.

Figs. 8, 9 and 10 are a side view, an end view and an elevation, respectively, of the loop link after the ends of the loop have been splayed.

Fig. 11 is an elevation of a subassembly of the swivel showing the shank of the eye bolt upended.

Fig. 12 is an elevation of the complete swivel showing the ends of the loop welded to the subassembly shown in Fig. 11.

Figs. 13, 14 and 15 are oblique views of a modified form of the invention.

Referring more particularly to sheet 1 of the drawings, Fig. 1 shows a blank 10 for the eye bolt cut from heavy steel plate, preferably with an acetylene torch, and comprising a shank 11 integral with a ring 12 having a circular aperture 13 which may be either flame cut or drilled. The neck of the swivel 14, and the collar 16, Figs. 2 and 3 are both cut from round bar stock of appropriate diameters and are axially drilled to form central apertures 15 and 17, respectively. The loop 18, Fig. 4, is cut from a straight piece of bar stock of circular cross section and then heated and bent into a U-shape in a bulldozer. It will be seen that all of the parts are cut from standard forms and the initial operations performed by means of ordinary shop tools and equipment.

The blank 10 is heated and rounded in a press using special dies for the purpose so that the ring 12 is transformed into a torus and the shank 11 into an elongated cylinder, Fig. 5, to form the eye bolt 19 of the swivel. The diameter of the shank 11 is smaller than the diameter of the aperture 15 of the neck 14 in which it loosely fits to permit relative rotation therebetween. The bore 17 of the collar 16 slidably fits on the shank 11 with little play therebetween. One of the two parallel faces of the collar 16 is adapted to bear against the neck 14 while the other face is provided with grooved recesses 20, Fig. 6, which project a short distance into the inner wall of the collar forming aperture 17 for a purpose subsequently described. The collar 16 may be heat treated or tempered to increase its wearing qualities.

The ends 21 and 22 of the loop 18 are spaced apart a distance equal to the diameter of the neck 14. These ends 21 and 22 are then heated and forged so that they are flattened in a direction tangent to the surface of the neck 14 which they are adapted to engage. The ends are splayed along a length thereof corresponding to the thickness of the neck as clearly shown in Fig. 8.

In assembling the swivel, the neck 14 and collar 16 are mounted on shank 11 of the eye bolt, the collar having the notched face adjacent the end of the shank. The shank is then heated and upset with a die to form a rivet shaped head 23 thereon and to force the metal of the head 23 and shank 11 into the grooves 20 of the collar 16, Fig. 11, thus uniting the collar to the eye bolt so that upon relative rotation of the bolt with respect to the loop link the bearing surface therebetween will be at the point of contact of the faces of the collar and neck. It will be seen that this construction serves to keep the shank 11 from expanding and freezing in the bore 17 of the collar 14 during the upending process. The collar also provides a flat bearing surface of relatively harder material than the rivet head 23 and is consequently better adapted to withstand the wear between the eye bolt and the collar when the swivel is in use.

The ends 21 and 22 of the loop 18 are then positioned on diametrically opposed sides of the neck 14 with the axes of the parallel portion of the loop parallel to the axis of the neck 14. The ends of the loop are then welded to the neck around adjoining portions thereof as indicated by the weld metal 24 and 25, Fig. 12. The flattening of the ends of the loop permits a greater length of weld to be obtained with a corresponding increase in strength.

In the modified form of the invention shown in Figs. 13 to 15, the elements comprising the swivel are cut from stock materials in much the same manner as previously described for the manufacture of the swivel shown in Fig. 12. The neck 26 has two diametrically opposed grooves 27 and 28 cut in the cylindrical wall 29 thereof in a direction parallel to the axis of the cylinder. The grooves are shown shallow and semi-elliptical in form, though it is to be understood that grooves of other configuration may be used.

The U-shaped bar 30 has its ends 31 and 32 spaced apart a distance equal to the distance between the grooves 27 and 28 and forged so that they are approximately elliptical in cross section along a length thereof corresponding to the thickness of the neck 26. The shape of the grooves is designed to correspond with that of the ends of the loop so that they seat therein.

The eyebolt 33 is inserted in the neck and shank thereof upset as described in connection with the construction of the swivel shown in Fig. 12. The ends 31 and 32 of the U-shaped bar 30 are then fitted into the grooves 27 and 28, respectively, and the bar welded to the neck along the edges of the area of contact thereof as indicated by the weld metal 34 and 35, Fig. 15.

It will be seen that I have disclosed a method peculiarly adapted to making large swivels from stock materials, using only ordinary shop tools and requiring only a moderate amount of mechanical skill in any of the steps involved, and capable of being carried out in shops lacking the heavy equipment necessary to forge swivels of large size.

While I have described the preferred form of my invention I do wish to limit myself to the precise details as shown but wish to avail myself of such variations and modifications as may come within the scope of the appended claim.

The invention described herein may be manufactured and used by or for the government of the United States of America for governmental purposes without the payment of any royalties thereon or therefor.

I claim:

Steps in a method of making a swivel comprising forming an axially apertured neck, inserting the shank of an eye bolt through the aperture in the neck, forming a collar of an internal diameter to fit on the shank and with recesses in the collar exposed at the internal surface and end surface thereof, placing the collar on the shank with the recessed end surface of the collar facing toward the end of the shank, upsetting the shank over the end of said collar and into said recesses of the collar to unite the collar to the shank of the eye bolt, then bending a bar into a loop and fitting its ends along opposite sides of said neck, and welding the ends of the bar to the opposite sides of the neck with the bent bar in a plane with the axis of the aperture in the neck.

DWIGHT A. CHASE.

REFERENCES CITED

The following references are of record in the file of this patent:

UNITED STATES PATENTS

| Number | Name | Date |
|---|---|---|
| 1,133,806 | Lachman | Mar. 30, 1915 |
| 1,423,244 | Moore | July 18, 1922 |
| 2,399,188 | Janiszewski | Apr. 30, 1946 |

FOREIGN PATENTS

| Number | Country | Date |
|---|---|---|
| 131,540 | Great Britain | Aug. 28, 1919 |